US012242407B1

United States Patent
Lipson et al.

(10) Patent No.: US 12,242,407 B1
(45) Date of Patent: Mar. 4, 2025

(54) APPARATUS, SYSTEM, AND METHOD FOR CONDUCTING MISSION-MODE TESTING ON HIGH-SPEED LINKS

(71) Applicant: Advanced Micro Devices, Inc., Santa Clara, CA (US)

(72) Inventors: Samuel Abraham Lipson, Austin, TX (US); Eric Christopher Morton, Austin, TX (US); Bryan P. Broussard, Austin, TX (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 38 days.

(21) Appl. No.: 17/983,340

(22) Filed: Nov. 8, 2022

(51) Int. Cl.
G06F 13/40 (2006.01)

(52) U.S. Cl.
CPC ...... *G06F 13/4022* (2013.01); *G06F 13/4063* (2013.01)

(58) Field of Classification Search
None
See application file for complete search history.

(56) References Cited

U.S. PATENT DOCUMENTS

| | | | |
|---|---|---|---|
| 8,244,882 B2* | 8/2012 | Davidson | H04L 67/1006 709/228 |
| 9,472,308 B1* | 10/2016 | Hwang | G11C 29/76 |
| 2005/0259587 A1* | 11/2005 | Wakumoto | H04L 45/34 370/254 |
| 2015/0257081 A1* | 9/2015 | Ramanujan | H04L 45/56 370/329 |
| 2018/0196103 A1* | 7/2018 | Champoux | G01R 31/31908 |
| 2019/0163596 A1* | 5/2019 | Eckert | G06F 11/277 |
| 2023/0052559 A1* | 2/2023 | Chen | G06F 11/3688 |

* cited by examiner

*Primary Examiner* — Henry Tsai
*Assistant Examiner* — Aurangzeb Hassan
(74) *Attorney, Agent, or Firm* — Greenberg Traurig, LLP

(57) ABSTRACT

An exemplary data fabric device comprises a first traffic moderator configured to receive traffic destined for a specific endpoint accessible via a plurality of data paths and divert the traffic from a first data path included in the data paths to a second data path included in the data paths. The exemplary data fabric device also comprises a first interconnect controller that resides within the second data path and is configured to forward the traffic to the specific endpoint via a first communication link to test a functionality of the first communication link. Various other apparatuses, systems, and methods are also disclosed.

20 Claims, 7 Drawing Sheets

APPARATUS, SYSTEM, AND METHOD FOR CONDUCTING MISSION-MODE TESTING ON HIGH-SPEED LINKS

BACKGROUND

Data fabrics are often deployed to facilitate access, interconnection, and/or integration across various resources, components, and/or endpoints. For example, data fabric devices can include and/or represent an architecture that integrates and/or standardizes data management services, practices, and/or solutions for various resources, components, and/or endpoints on a server. In this example, the data fabric devices can facilitate, provide, and/or support high-speed links that run external to the corresponding sockets. Unfortunately, some system-level testing (SLT) technologies lack the capability to perform and/or conduct comprehensive mission-mode testing on such high-speed links. As a result, some faulty data fabric devices whose high-speed links ultimately malfunction upon field deployment can pass quality control without detection. The instant disclosure, therefore, identifies and addresses a need for additional and improved apparatuses, systems, and methods for conducting mission-mode testing on high-speed links.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Figure 1:
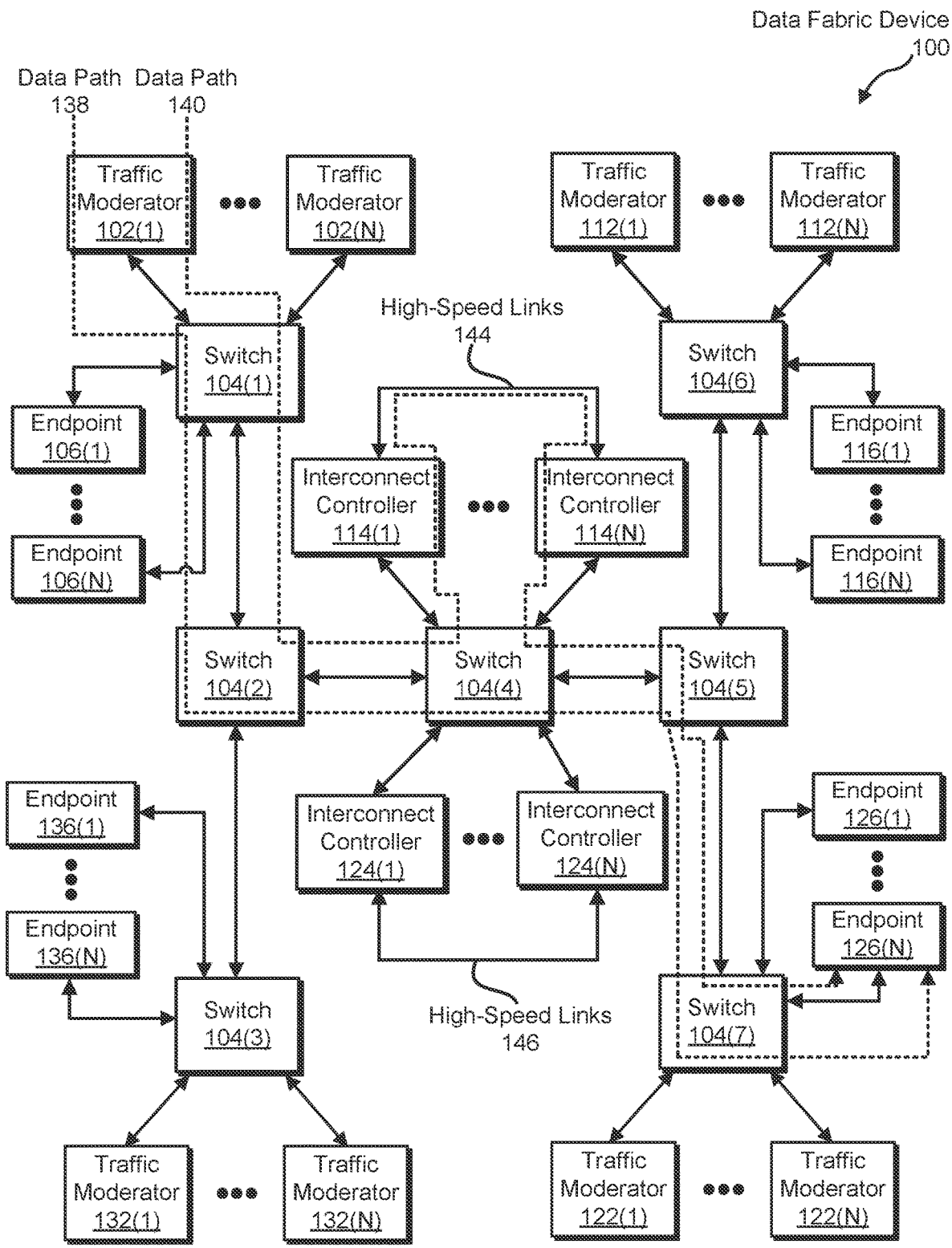
FIG. 1 is an illustration of a portion of an exemplary data fabric device capable of conducting self-contained mission-mode testing according to one or more implementations of this disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various apparatuses, systems, and methods for conducting mission-mode testing on high-speed links. In some examples, SLT can be used to assess and/or test one or more functionalities of high-speed links and/or data fabric devices for quality-control purposes prior to release and/or shipment. Some SLT technologies include and/or involve somewhat expensive mechanical handlers or gantries that have limited space and/or capacity for certain resources, components, and/or endpoints, such as peripheral component interconnect express (PCIe) cards and/or additional sockets. Accordingly, due to these limitations and/or deficiencies, these SLT technologies could be unable to conduct comprehensive and/or robust testing on some data fabric devices that incorporate such resources, components, and/or endpoints.

Moreover, data fabric devices continue to evolve and/or advance in terms of resources and/or functionalities. As a result of such evolution and/or advancement, the size of some data fabric devices and/or the number of high-speed communication links implemented by these data fabric devices can increase and/or expand, thereby potentially impairing the testing of such devices further with the traditional SLT technologies. To address and/or counteract these limitations or deficiencies, the various apparatuses, systems, and methods described herein can provide a self-contained solution for conducting mission-mode testing on high-speed links facilitated, provided, and/or supported by data fabric devices without the need to modify the mechanical handlers or gantries included and/or involved in the existing SLT technologies. By doing so, these apparatuses, systems, and methods can improve the SLT of high-speed links and/or data fabric devices and significantly reduce the costs necessary to achieve this improved SLT by avoiding superfluous endpoint purchases and/or increasing (e.g., doubling) the board density of the mechanical handlers and/or gantries.

As will be described in greater detail below, an exemplary self-contained solution for SLT of high-speed links and/or data fabric devices can include and/or involve diverting traffic destined for a specific endpoint from the typical data path to a worst-case data path (or scenic route) as the high-speed links undergo training in mission mode. As used herein, the terms "mission mode" and "mission-mode testing" generally refer to training and/or testing that mimic and/or simulate the mode of operation implemented by high-speed links and/or data fabric devices upon field deployment and/or user operation. In one example, this solution includes and/or involves changing the programmed routing of the data fabric to route data and/or traffic to a socket-to-socket global memory interconnect (xGMI) controller. By doing so, this solution enables the data and/or traffic to travel and/or traverse high-speed communication links (e.g., SerDes links, physical layer links, etc.) for training and/or testing purposes. In certain implementations, the high-speed communication links and/or endpoints can constitute and/or represent components of the data fabric.

In some examples, this solution can modify the xGMI controller to interpret the data and/or traffic directed to those high-speed communication links differently via a design-for-test (DFT) feature. For example, this solution can include and/or involve the xGMI controller sending traffic from one high-speed communication link to another through a wire-to-wire connection. In this example, the DFT feature can cause the xGMI controller to spoof an address of the traffic to specify and/or indicate a remote socket, thereby leading the xGMI controller to interpret the outgoing traffic as exiting the data fabric for a remote socket. However, instead of actually going to a remote socket, the traffic is diverted to another xGMI controller on the data fabric via the other high-speed communication link.

In some examples, as the traffic arrives at the other xGMI controller, the DFT feature can cause the other xGMI controller to replace the spoofed address of the traffic with another address that specifies a local socket. In such examples, the other xGMI controller then sends the traffic toward the specific endpoint based on the other address as part of the SLT. In one example, to force the traffic from the typical data path to the worst-case data path, the DFT feature can cause the addresses of attached double data rate (DDR) memory devices to be interleaved relative to one another. By doing so, the DFT feature can cause the traffic to go across and/or pass through the high-speed communication links to reach a remote node of DDR memory on the socket. This forced diversion of the traffic can essentially make the physical layer of the Open Systems Interconnection (OSI) model appear as part of the data fabric.

In some examples, a data fabric device includes a first traffic moderator configured to receive traffic destined for a specific endpoint accessible via a plurality of data paths and/or divert the traffic from a first data path included in the data paths to a second data path included in the data paths. In such examples, the data fabric device includes a first interconnect controller that resides within the second data path and is configured to forward the traffic to the specific endpoint via a first communication link to test a functionality of the first communication link.

In some examples, the first interconnect controller is configured to spoof an address of the traffic to specify a remote socket and then send the traffic toward the specific endpoint via the first communication link based at least in part on the spoofed address of the traffic. In one example, the data fabric device also includes a second interconnect controller that resides within the second data path and is configured to receive the traffic destined for the specific endpoint via a second communication link and replace the spoofed address of the traffic with an additional address that specifies a local socket. In this example, the second interconnect controller is further configured to send the traffic further toward the specific endpoint based at least in part on the additional address. In certain implementations, the first communication link and the second communication link are communicatively coupled to one another.

In some examples, the data fabric device also includes a plurality of memory devices whose addresses are interleaved relative to one another. In such examples, the specific endpoint represents a specific memory device included in the memory devices.

In some examples, the data fabric device also includes a processing device that directs the first traffic moderator to enable a system-level test (SLT) mode. In such examples, the first traffic moderator diverts the traffic from the first data path to the second data path due at least in part to the SLT mode being enabled.

In some examples, the first traffic moderator is further configured to perform an address lookup for the traffic in SLT mode and/or identify an address corresponding to the specific endpoint via the second data path. In such examples, the first traffic moderator is also configured to apply the address to the traffic to direct the traffic along the second data path to the first interconnect controller.

In some examples, the processing device is further configured to direct the first traffic moderator to disable the SLT mode upon completion of a system test. In such examples, the first traffic moderator is configured to disable the SLT mode in response to the direction from the processing device by clearing a register responsible for setting the SLT mode. In one example, the processing device is further configured to achieve the disabling of the SLT mode without rebooting the data fabric device.

In some examples, the data fabric device also includes a second traffic moderator configured to receive additional traffic destined for an additional endpoint accessible via a plurality of additional data paths and/or divert the traffic from a first data path included in the additional data paths to a second data path included in the additional data paths. In such examples, the data fabric device further includes a second interconnect controller that resides within the second data path and is configured to forward the additional traffic to the additional endpoint via a second communication link to test a functionality of the second communication link.

In some examples, the data fabric device also includes a first network socket implemented in connection with the first traffic moderator and the first interconnect controller. In such examples, the data fabric device further includes a second network socket implemented in connection with the second traffic moderator and the second interconnect controller. In one example, the first communication link and second communication link collectively form and/or facilitate a socket-to-socket connection for testing the first network socket and the second network socket by simulating communication at an operational speed.

In some examples, the data fabric device, also includes a first integrated circuit (IC) die that implements the first network socket and a second IC die that implements the second network socket. In such examples, the socket-to-socket connection spans across the first IC die and the second IC die.

In some examples, the first traffic moderator constitutes a cache-coherent moderator, and the first interconnect controller constitutes a coherent socket extender. In one example, the data fabric device also includes at least one global memory interconnect (GMI) that is communicatively coupled to the first traffic moderator and configured to connect at least one processing device to the specific endpoint via the first traffic moderator, the first interconnect controller, and/or the first communication link. In this example, the GMI is further configured to receive the traffic from the processing device and/or feed the traffic to the first traffic moderator for transmission to the specific endpoint via the first communication link. In certain implementations, the specific endpoint constitutes a DDR memory device, and/or the first communication link constitutes a SerDes link.

In some examples, a system includes a test board, at least one endpoint device installed on the test board, and/or a data fabric device installed on the test board. In such examples, the data fabric device includes a first traffic moderator configured to receive traffic destined for the endpoint device and/or divert the traffic from a first data path to a second data path. In one example, the data fabric device also includes a first interconnect controller that resides within the second data path and is configured to forward the traffic to the endpoint via a first communication link to test a functionality of the first communication link.

In some examples, a method includes receiving, by a traffic moderator of a data fabric, traffic destined for a specific endpoint accessible via a plurality of data paths. In such examples, the method also includes diverting, by the traffic moderator of the data fabric, the traffic from a first data path included in the data paths to a second data path included in the data paths. In one example, the method further includes forwarding, by an interconnect controller of the data fabric that resides within the second data path, the traffic to the specific endpoint via a communication link to test a functionality of the first communication link.

The following will provide, with reference to FIGS. 1-6, detailed descriptions of exemplary apparatuses, devices, systems, and/or corresponding implementations for conducting mission-mode testing on high-speed links. Detailed descriptions of an exemplary method for conducting mission-mode testing on high-speed links will be provided in connection with FIG. 7.

FIG. 1 illustrates a portion of an exemplary data fabric device 100 capable of conducting self-contained mission-mode testing. As illustrated in FIG. 1, exemplary data fabric device 100 includes and/or represents various traffic moderators, switches, interconnect controllers, and/or endpoints. For example, data fabric device 100 can include and/or represent traffic moderators 102(1)-(N), 112(1)-(N), 122(1)-(N), and/or 132(1)-(N). In this example, data fabric device 100 can also include and/or represent switches 104(1), 104(2), 104(3), 104(4), 104(5), 104(6), and/or 104(7). Additionally or alternatively, data fabric device 100 can include and/or represent interconnect controllers 114(1)-(N) and/or 124(1)-(N) as well as endpoints 106(1)-(N), 116(1)-(N), 126(1)-(N), and/or 136(1)-(N). In certain implementations, interconnect controllers 114(1)-(N) can be communicatively coupled to one another via high-speed links 144, and/or interconnect controllers 124(1)-(N) can be communicatively coupled to one another via high-speed links 146.

In some examples, switch 104(1) is communicatively coupled between traffic moderators 102(1)-(N), endpoints 106(1)-(N), and/or switch 104(2). In such examples, switch 104(1) provides, facilitates, and/or supports communication among traffic moderators 102(1)-(N), endpoints 106(1)-(N), and/or switch 104(2). In one example, switch 104(1) can perform packet switching and/or data standardization for data and/or traffic exchanged between traffic moderators 102(1)-(N), endpoints 106(1)-(N), and/or switch 104(2).

In some examples, switch 104(3) is communicatively coupled between traffic moderators 132(1)-(N), endpoints 136(1)-(N), and/or switch 104(2). In such examples, switch 104(3) provides, facilitates, and/or supports communication among traffic moderators 132(1)-(N), endpoints 136(1)-(N), and/or switch 104(2). In one example, switch 104(3) can perform packet switching and/or data standardization for data and/or traffic exchanged between traffic moderators 132(1)-(N), endpoints 136(1)-(N), and/or switch 104(2).

In some examples, switch 104(6) is communicatively coupled between traffic moderators 112(1)-(N), endpoints 116(1)-(N), and/or switch 104(5). In such examples, switch 104(6) provides, facilitates, and/or supports communication among traffic moderators 112(1)-(N), endpoints 116(1)-(N), and/or switch 104(5). In one example, switch 104(6) can perform packet switching and/or data standardization for data and/or traffic exchanged between traffic moderators 112(1)-(N), endpoints 116(1)-(N), and/or switch 104(5).

In some examples, switch 104(7) is communicatively coupled between traffic moderators 122(1)-(N), endpoints 126(1)-(N), and/or switch 104(5). In such examples, switch 104(7) provides, facilitates, and/or supports communication among traffic moderators 122(1)-(N), endpoints 126(1)-(N), and/or switch 104(5). In one example, switch 104(3) can perform packet switching and/or data standardization for data and/or traffic exchanged between traffic moderators 122(1)-(N), endpoints 126(1)-(N), and/or switch 104(5).

In some examples, switch 104(4) is communicatively coupled between interconnect controllers 114(1)-(N), interconnect controllers 124(1)-(N), and/or switches 104(2) and 104(5). In such examples, switch 104(4) provides, facilitates, and/or supports communication among interconnect controllers 114(1)-(N), interconnect controllers 124(1)-(N), and/or switches 104(2) and 104(5). In one example, switch 104(4) can perform packet switching and/or data standardization for data and/or traffic exchanged between traffic moderators 122(1)-(N), endpoints 126(1)-(N), and/or switch 104(5).

In some examples, data fabric device 100 implements and/or applies a DFT feature that, when activated, can cause one or more of traffic moderators 102(1)-(N), 112(1)-(N), 122(1)-(N), and/or 132(1)-(N) to modify and/or divert data or traffic to the worst-case data path. By doing so, the DFT feature enables data fabric device 100 to comprehensively test certain functionalities and/or features of high-speed links 144 and 146, which lie outside the typical data path for such traffic, as part of an SLT.

In some examples, traffic arrives at traffic moderator 102(1) from one or more processing devices, such as a central processing unit (CPU) and/or a graphics processing unit (GPU). In one example, this traffic is destined for a specific endpoint included in and/or connected to data fabric device 100. For example, traffic destined for endpoint 126 (N) can arrive at traffic moderator 102(1). In this example, if the DFT feature is activated as part of an SLT, traffic moderator 102(1) receives the traffic destined for endpoint 126(N), which is accessible via at least data paths 138 and 140, and then diverts the traffic from data path 138 to data path 140. In other words, traffic moderator 102(1) can reroute traffic destined for endpoint 126(N) to take one or more of high-speed links 144 to reach endpoint 126(N), instead of simply traversing straight across switches 104(2), 104(4), and/or 104(6), when the DFT feature is activated for training and/or testing purposes.

In some examples, data path 138 can constitute and/or represent the typical and/or best-case data path for traffic travelling and/or traversing from traffic moderator 102(1) to endpoint 126(N). In one example, data path 138 includes and/or represents the route and/or path across traffic moderator 102(1), switch 104(1), switch 104(2), switch 104(4), switch 104(5), switch 104(7), and/or endpoint 126(N). In this example, data path 138 constitutes and/or represents this sequence and/or order of traversal from traffic moderator 102(1) to endpoint 126(N). Accordingly, data path 138 excludes and/or omits interconnect controllers 114(1)-(N) and 124(1)-(N) as well as high-speed links 144 and 146.

In contrast, data path 140 can constitute and/or represent the scenic route and/or worst-case data path for traffic travelling and/or traversing from traffic moderator 102(1) to endpoint 126(N). In one example, data path 140 includes and/or represents the route and/or path across traffic moderator 102(1), switch 104(1), switch 104(2), switch 104(4), interconnect controller 114(1), one or more of high-speed links 144, interconnect controller 114(N), switch 104(4), switch 104(5), switch 104(7), and/or endpoint 126(N). In this example, data path 140 constitutes and/or represents this sequence and/or order of traversal from traffic moderator 102(1) to endpoint 126(N). Accordingly, in contrast to data path 138, data path 140 includes and/or represents interconnect controllers 114(1) and 114(N) as well as high-speed links 144 and 146.

In some examples, when the DFT feature is activated, one or more components of data fabric device 200 can implement and/or apply an SLT mode in which high-speed links 144 and 146 are trained and/or tested. In SLT mode, traffic moderator 102(1) can perform an address lookup for the traffic destined for endpoint 126(N). In one example, as part of this address lookup, traffic moderator 102(1) identifies an address corresponding to endpoint 126(N) via and/or along data path 140. In this example, traffic moderator 102(1) then applies this address to the traffic to direct the traffic along data path 140 toward interconnect controller 114(1), thus forcing the traffic to pass through one or more of high-speed links 144 on the way to endpoint 126(N).

In some examples, interconnect controller 114(1) resides within and/or along data path 140 but not within and/or along data path 138. In one example, interconnect controller 114(1) is configured to forward and/or send the traffic toward endpoint 126(N) via one or more of high-speed links 144. By doing so, interconnect controller 114(1) can contribute to and/or facilitate training and/or testing the functionality (e.g., communication, speed, connectivity, and/or reliability) of high-speed links 144.

In some examples, the processes and/or features described above in connection with data paths 138 and 140 can also be applied and/or iterated across all routes and/or data paths of data fabric device 100 to facilitate a comprehensive SLT in mission mode. For example, traffic moderator 102(1) can divert test data and/or traffic to comparable worst-case data paths to reach endpoints via all of high-speed links 144 and/or high-speed links 146 for SLT purposes. Similarly, traffic moderators 102(N), 112(1)-(N), 122(1)-(N), and 132(1)-(N) can also divert test data and/or traffic to worst-case data paths to reach endpoints via all of high-speed links 144 and/or high-speed links 146 for SLT purposes.

As a specific example, traffic moderator 112(N) can receive traffic destined for endpoint 106(1) from one or more processing devices, such as a CPU core and/or a GPU core. In this example, if the DFT feature is activated as part of an SLT, traffic moderator 112(N) can divert traffic from the typical and/or best-case data path to a scenic route and/or worst-case data path via one or more of high-speed links 144 or 146 on the way to endpoint 106(1). For example, traffic moderator 112(N) can force traffic along the scenic route and/or worst-case data path to endpoint 106(1) via high-speed links 144 or 146 when the DFT feature is activated as part of the SLT. In one example, interconnect controller 114(N) can forward and/or send the traffic toward endpoint 106(1) via one of high-speed links 144 to test its functionality. Additionally or alternatively, interconnect controller 124(N) can forward and/or send the traffic toward endpoint 106(1) via one of high-speed links 146 to test its functionality.

In some examples, the DFT feature that enables the SLT mode can cause multiple memory devices to implement an interleaved address configuration. For example, endpoints 106(1)-(N), 116(1)-(N), 126(1)-(N), and/or 136(1)-(N) can include and/or represent DDR dynamic random access memory (DRAM) devices and/or sticks. In this example, the addresses of the DDR DRAM devices and/or channels can be interleaved relative to one another.

In some examples, the memory for a particular workload can be diced up and/or distributed equally across all the DDR DRAM devices and/or channels during the SLT. In such examples, this equal dicing and/or distribution of memory across all the DDR DRAM devices and/or channels causes traffic to travel and/or traverse across all the various routes and/or data paths when executing and/or running a certain program and/or application.

In some examples, data fabric device 100 can constitute and/or represent a portion of a larger microprocessor. For example, data fabric device 100 can constitute and/or represent circuitry in a microprocessor that includes various CPU and/or GPU cores, IC dies, physical layer devices and/or circuits (sometimes referred to as "PHYs"), interfaces, memory devices, sockets, GMIs, along with various additional circuits, devices, and/or features. Additionally or alternatively, data fabric device 100 can constitute and/or represent a standalone interconnection architecture that facilitates connecting, standardizing, and/or integrating various devices and/or protocols with one another.

In some examples, traffic moderators 102(N), 112(1)-(N), 122(1)-(N), and 132(1)-(N) can each include and/or represent a cache-coherent moderator. Additionally or alternatively, traffic moderators 102(N), 112(1)-(N), 122(1)-(N), and 132(1)-(N) can each include and/or represent a request agent and/or interface. In one example, traffic moderators 102(N), 112(1)-(N), 122(1)-(N), and 132(1)-(N) are responsible for issuing DRAM requests and/or facilitating coherent data transports between processing cores.

In some examples, interconnect controllers 114(1)-(N) and 124(1)-(N) can each include and/or represent a coherent socket extender and an xGMI controller. In such examples, interconnect controllers 114(1)-(N) and 124(1)-(N) can interface and/or connect different sockets and/or dies together or with one another via high-speed links 144 and/or 146. In one example, interconnect controllers 114(1)-(N) and 124(1)-(N) can encode certain data and/or traffic requests into serialized packets for transmission via high-speed links 144 and/or 146. Additionally or alternatively, interconnect controllers 114(1)-(N) and 124(1)-(N) can decode certain data and/or traffic responses received via high-speed links 144 and/or 146 into deserialized packets.

In some examples, switches 104(1)-(7) can each include and/or represent a network-on-chip (NoC) switch. Additionally or alternatively, switches 104(1)-(7) can each include and/or represent a crossbar switch. In one example, switches 104(1)-(7) each have the routing function to transmit packets from a source to a destination.

In some examples, high-speed links 144 and 146 can each include and/or represent SerDes interfaces, connections, and/or links. Additionally or alternatively, high-speed links 144 and 146 can each include and/or represent physical layer links and/or "PHY" devices and/or circuits. In one example, high-speed links 144 can be formed and/or established by interfacing interconnect controllers 114(1) and 114(N) to one another, and/or high-speed links 146 can be formed and/or established by interfacing interconnect controllers 124(1) and 124(N) to one another. In this example, the physical layer links and/or "PHY" devices and/or circuits can appear to be part of the data fabric.

In some examples, endpoints 106(1)-(N), 116(1)-(N), 126(1)-(N), and/or 136(1)-(N) can each include and/or represent a memory device incorporated into and/or connected to data fabric device 100. For example, endpoints 106(1)-(N), 116(1)-(N), 126(1)-(N), and/or 136(1)-(N) can each include and/or represent a DDR DRAM device. In one example, each DDR DRAM device can be installed and/or inserted into a test board that holds data fabric device 100 for the SLT. Additionally or alternatively, endpoints 106(1)-(N), 116(1)-(N), 126(1)-(N), and/or 136(1)-(N) can each include and/or represent a coherent station and/or home agent.

Figure 2:
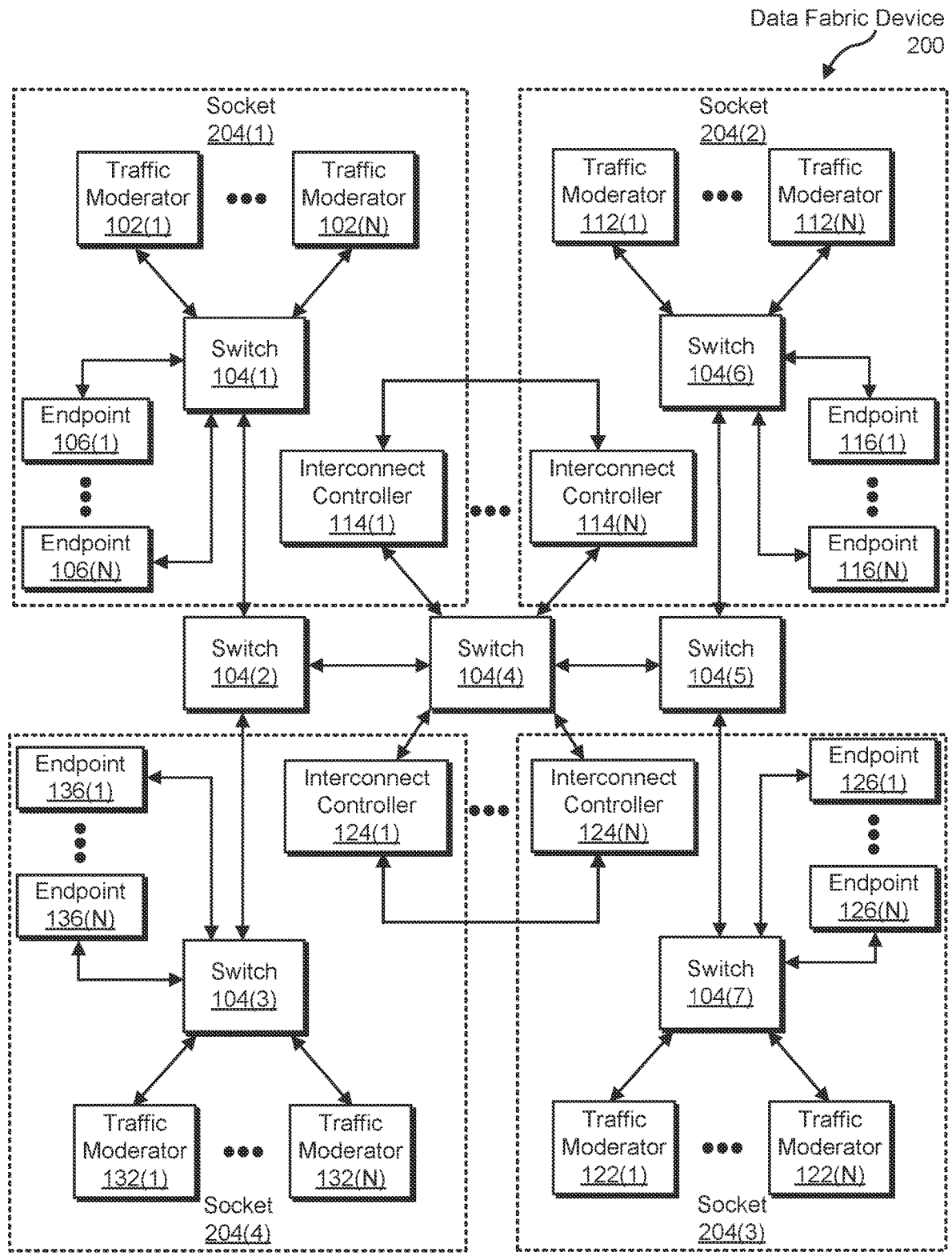
FIG. 2 is an illustration of a portion of an exemplary data fabric device capable of conducting self-contained mission-mode testing according to one or more implementations of this disclosure.

FIG. 2 illustrates a portion of an exemplary data fabric device 200 capable of conducting self-contained mission-mode testing. As illustrated in FIG. 2, exemplary data fabric device 200 (like data fabric device 100 in FIG. 1) includes and/or represents various traffic moderators, switches, interconnect controllers, and/or endpoints. In some examples, data fabric device 200 can include and/or represent certain components and/or features that perform and/or provide functionalities that are similar and/or identical to those described above in connection with FIG. 1. In one example, data fabric device 200 can implement, facilitate, and/or establish various network sockets in connection with different components, IC dies, and/or processing devices.

In some examples, data fabric device 200 can implement and/or instantiate a socket 204(1) in connection with one or more of traffic moderators 102(1)-(N), endpoints 106(1)-(N), and/or interconnect controller 114(1). In such examples, data fabric device 200 can implement and/or instantiate a socket 204(2) in connection with one or more of traffic moderators 112(1)-(N), endpoints 116(1)-(N), and/or interconnect controller 114(N). In one example, data fabric device 200 can implement and/or instantiate a socket 204(3) in connection with one or more of traffic moderators 122(1)-(N), endpoints 126(1)-(N), and/or interconnect controller 124(N). Additionally and/or alternatively, data fabric device 200 can implement and/or instantiate a socket 204(4) in connection with one or more of traffic moderators 132(1)-(N), endpoints 136(1)-(N), and/or interconnect controller 124(1).

In some examples, high-speed links 144 between interconnect controllers 114(1) and 114(N) can form, constitute, and/or represent a socket-to-socket connection for training and/or testing sockets 204(1) and 204(2) by simulating communication at operational speed (e.g., the same speed used during field deployment). In some examples, high-speed links 146 between interconnect controllers 124(1) and 124(N) can form, constitute, and/or represent a socket-to-socket connection for training and/or testing sockets 204(3) and 204(4) by simulating communication at operational speed (e.g., the same speed used during field deployment).

In some examples, data fabric device 200 can be distributed and/or disposed across multiple IC dies. For example, one IC die can implement and/or instantiate socket 204(1), and another IC die can implement and/or instantiate socket 204(2). Additionally or alternatively, one IC die can implement and/or instantiate socket 204(3), and another IC die can implement and/or instantiate socket 204(4). Accordingly, the socket-to-socket connection can span across multiple dies. As a result, data fabric device 200 can implement and/or provide die-to-die communication via high-speed links 144 and 146.

Figure 3:
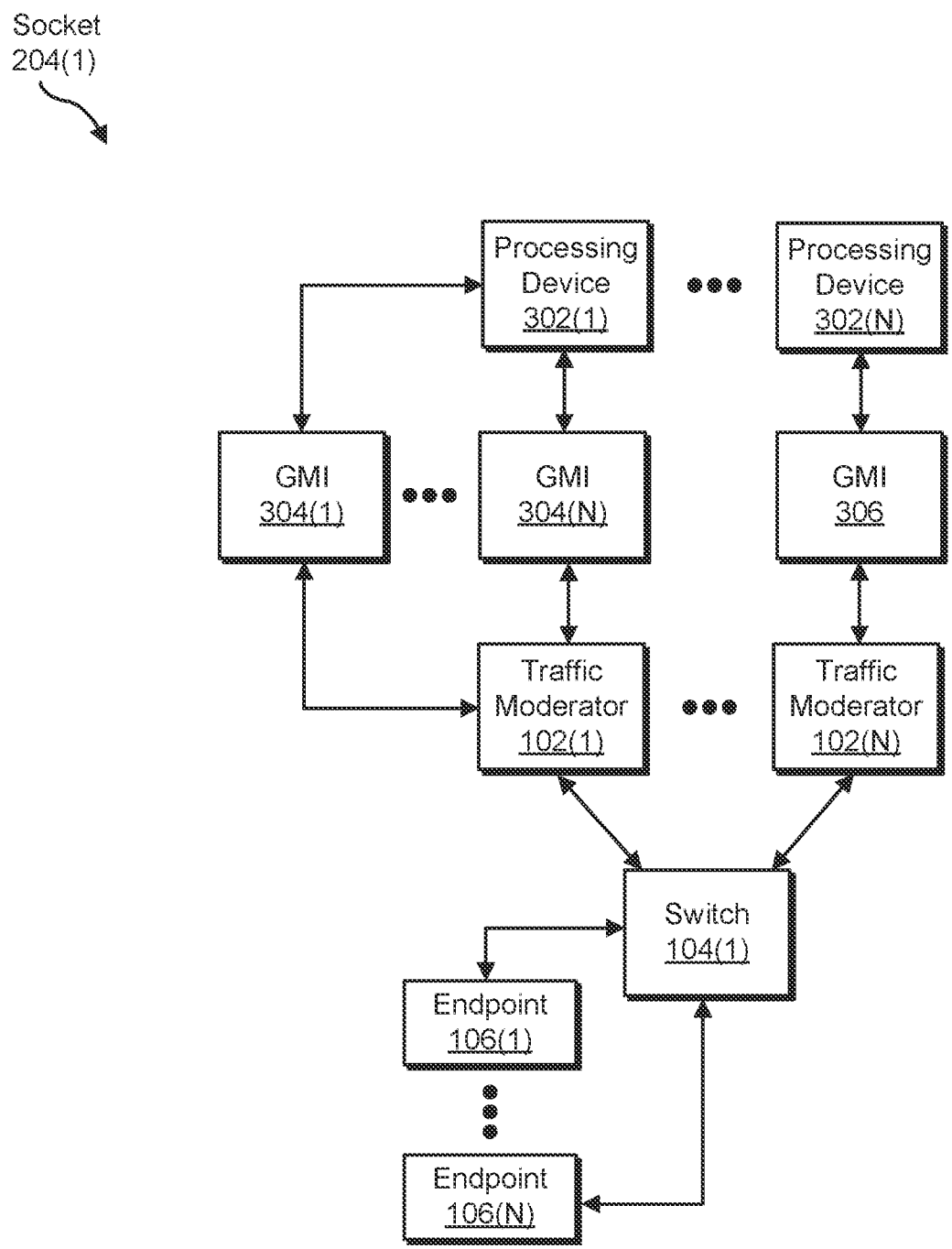
FIG. 3 is an illustration of an exemplary socket implemented by a data fabric device according to one or more implementations of this disclosure.

FIG. 3 illustrates an exemplary implementation of exemplary socket 204. As illustrated in FIG. 3, exemplary socket 204(1) can include and/or represent certain components and/or features that perform and/or provide functionalities that are similar and/or identical to those described above in connection with FIG. 1 or 2. In some examples, socket 204(1) can include and/or represent processing devices 302(1)-(N) and/or GMIs 304(1)-(N) and GMI 306. In one example, GMIs 304(1)-(N) are communicatively coupled between processing device 302(1) and traffic moderator 102(1). Additionally or alternatively, GMI 306 is communicatively coupled between processing device 302(N) and traffic moderator 102(N).

In some examples, one or more of processing devices 302(1)-(N) can direct and/or cause one or more of traffic moderators 102(1)-(N) to enable and/or activate the DFT feature and/or the SLT mode via firmware and/or a basic input/output system (BIOS). In one example, one or more of traffic moderators 102(1)-(N) can divert traffic from typical and/or best-case data paths to scenic routes and/or worst-case data paths due at least in part to the DFT feature and/or SLT mode being enable and/or activated.

In some examples, upon completion of the SLT, one or more of processing devices 302(1)-(N) can direct and/or cause one or more of traffic moderators 102(1)-(N) to disable and/or deactivate the DFT feature and/or the SLT mode via the firmware and/or BIOS. In response, one or more of traffic moderators 102(1)-(N) can disable and/or deactivate the DFT feature and/or the SLT mode by clearing a register responsible for engaging the DFT feature and/or setting the SLT mode. In one example, processing devices 302(1)-(N) and/or traffic moderators 102(1)-(N) can achieve and/or complete the disabling and/or deactivation of the DFT feature or SLT mode without rebooting data fabric device 100. In this example, the traffic subsequently originating from processing devices 302(1)-(N) can travel and/or traverse along the typical and/or best-case data paths and/or avoid the scenic routes and/or worst-case data paths.

In some examples, GMIs 304(1)-(N) can effectively connect processing device 302(1) to one or more of endpoints 106(1)-(N), 116(1)-(N), 126(1)-(N), and/or 136(1)-(N) via traffic moderator 102(1), and GMI 306 can effectively connect processing device 302(1) to such endpoints via traffic moderator 102(N). As a specific example, GMI 304(1) can receive the traffic destined for endpoint 126(N) and/or feed that traffic to traffic moderator 102(1) for transmission to endpoint 126(N) via data path 140 and/or one or more of high-speed links 144.

In some examples, processing devices 302(1)-(N) can each include and/or represent any type or form of hardware-implemented device and/or circuit capable of generating data and/or traffic for transmission across high-speed links 144 or 146. For example, one or more of processing devices 302(1)-(N) can include and/or represent a GPU and/or a GPU core. In another example, one or more of processing devices 302(1)-(N) can include and/or represent a CPU and/or a CPU core. Additional examples of processing devices 302(1)-(N) include, without limitation, parallel accelerated processors, tensor cores, microprocessors, microcontrollers, field-programmable gate arrays (FPGAs), application-specific integrated circuits (ASICs), systems on a chip (SoCs), integrated circuits, chiplets, portions of one or more of the same, variations or combinations of one or more of the same, and/or any other suitable processing devices.

Figure 4:
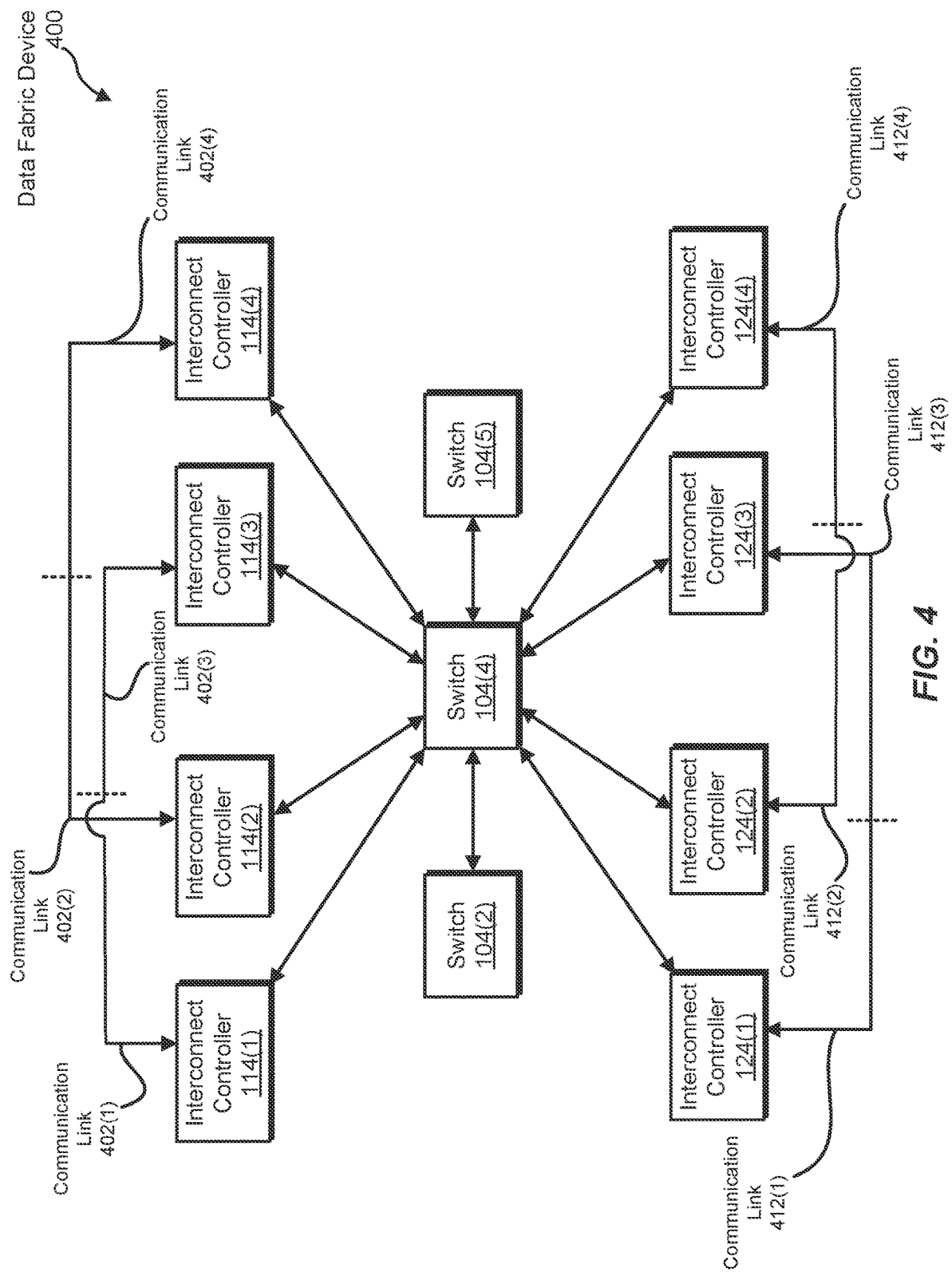
FIG. 4 is an illustration of a portion of an exemplary data fabric device capable of conducting self-contained mission-mode testing according to one or more implementations of this disclosure.

FIG. 4 illustrates a portion of exemplary data fabric device 400. As illustrated in FIG. 4, data fabric device 400 can include and/or represent certain components and/or features that perform and/or provide functionalities that are similar and/or identical to those described above in connection with any of FIGS. 1-3. In some examples, data fabric device 400 can include and/or represent interconnect controllers 114(1), 114(2), 114(3), 114(4), 124(1), 124(2), 124(3), and/or 124(4) that are all communicatively coupled to switch 104(4). In one example, high-speed links 144 in FIG. 1 correspond to and/or represent communication links 402(1), 402(2), 402(3), and/or 402(4) in FIG. 4. In this example, high-speed links 146 in FIG. 1 correspond to and/or represent communication links 412(1), 412(2), 412(3), and/or 412(4) in FIG. 4.

In some examples, interconnect controllers 114(1)-(4) and 124(1)-(4) can spoof the address of traffic to specify a remote socket (e.g., one apparently external to data fabric device 100 and/or the underlying processor) when the DFT feature is activated and/or the SLT mode is enabled. For example, interconnect controller 114(1) scrubs and/or removes an existing address from the traffic destined for endpoint 126(N). Additionally or alternatively, interconnect controller 114(1) can replace that address in the traffic with a different address that appears to correspond to a remote socket, thereby leading interconnect controller 114(1) to believe that this outgoing traffic is exiting data fabric device 100 and/or the underlying processor for a remote socket. However, instead of actually going to a remote socket, the traffic is diverted to interconnect controller 114(3) via communication links 402(1) and 402(3).

In some examples, interconnect controllers 114(1)-(4) and 124(1)-(4) can replace the spoofed address of the traffic with another address that specifies a local socket when the DFT feature is activated and/or the SLT mode is enabled. For example, interconnect controller 114(3) receives the traffic destined for endpoint 126(N) via communication links 402(1) and 402(3). In this example, interconnect controller 114(3) then replaces the spoofed address of the traffic with an additional address that specifies socket 204(3) in FIG. 2 as the location of the destination endpoint. Additionally or alternatively, interconnect controller 114(3) sends the traffic further toward endpoint 126(N) based at least in part on that additional address.

In some examples, communication link 402(1) includes and/or represents a SerDes link for interconnect controller 114(1), and communication link 402(3) includes and/or represents a SerDes link for interconnect controller 114(3). In one example, communication links 402(1) and 402(3) are communicatively coupled to one another by a wire-to-wire connection. In a specific implementation, data path 140 includes and/or represents communication links 402(1) and 402(3), and thus the traffic destined for endpoint 126(N) during an SLT passes through communication links 402(1) and 402(3).

In some examples, communication link 402(2) includes and/or represents a SerDes link for interconnect controller 114(2), and communication link 402(4) includes and/or represents a SerDes link for interconnect controller 114(4). In one example, communication links 402(2) and 402(4) are communicatively coupled to one another by a wire-to-wire connection. In a specific implementation, data path 140 includes and/or represents communication links 402(2) and 402(4), and thus the traffic destined for endpoint 126(N) during the SLT passes through communication links 402(2) and 402(4).

In some examples, communication link 412(1) includes and/or represents a SerDes link for interconnect controller 124(1), and communication link 412(3) includes and/or represents a SerDes link for interconnect controller 124(3). In one example, communication links 412(1) and 412(3) are communicatively coupled to one another by a wire-to-wire connection. In a specific implementation, a worst-case data path for some traffic includes and/or represents communication links 412(1) and 412(3), and thus that traffic can traverse from a traffic moderator to an endpoint through communication links 412(1) and 412(3) during the SLT.

In some examples, communication link 412(2) includes and/or represents a SerDes link for interconnect controller 124(2), and communication link 412(4) includes and/or represents a SerDes link for interconnect controller 124(4). In one example, communication links 412(2) and 412(4) are communicatively coupled to one another by a wire-to-wire connection. In a specific implementation, a worst-case data path for some traffic includes and/or represents communication links 412(2) and 412(4), and thus that traffic can traverse from a traffic moderator to an endpoint through communication links 412(2) and 412(4) during the SLT.

Figure 5:
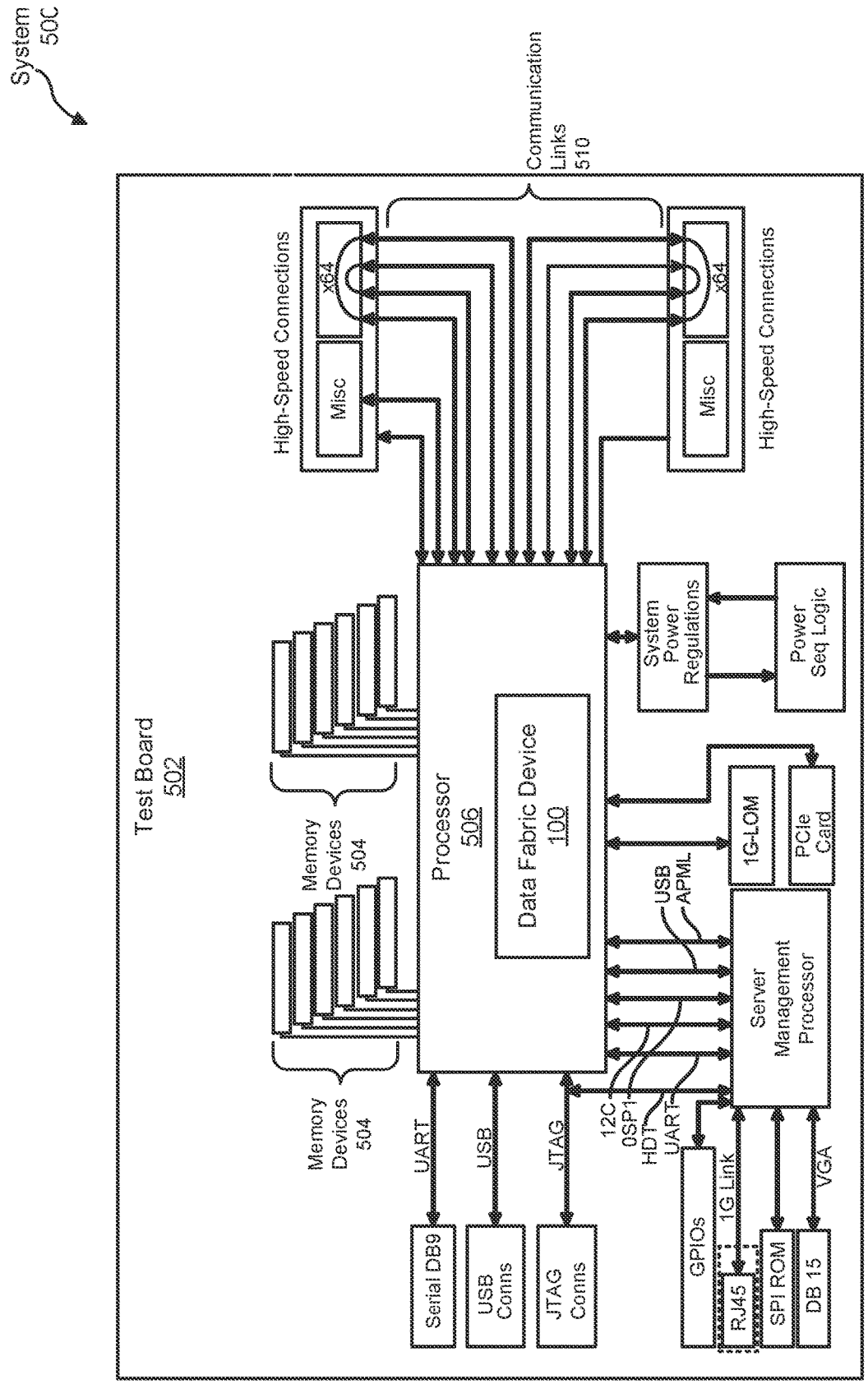
FIG. 5 is an illustration of an exemplary system for conducting mission-mode testing on high-speed links according to one or more implementations of this disclosure.

FIG. 5 illustrates an exemplary system 500 for conducting mission-mode testing on high-speed links and/or data fabric devices. As illustrated in FIG. 5, exemplary system 500 can include and/or represent various interfaces, devices, components, and/or features. In some examples, system 500 can include and/or represent certain components and/or features that perform and/or provide functionalities that are similar and/or identical to those described above in connection with any of FIGS. 1-4. In one example, system 500 includes and/or represents a test board 502 with a processor 506, memory devices 504, and/or communication links 510. In this example, processor 506 includes and/or incorporates data fabric device 100, and all or a portion of processor 506 constitutes and/or represents a device under test (DUT). Additionally or alternatively, processor 506 and/or memory devices 504 are installed and/or inserted into corresponding slots available on test board 502.

In some examples, test board 502 is incorporated into and/or controlled by a mechanical handler and/or gantry for conducting SLT on processor 506 and/or data fabric device 100. In one example, test board 502 includes and/or provides various peripherals that facilitate and/or support conducting SLT on processor 506 and/or data fabric device 100. Examples of such peripherals include, without limitation, one or more (UART) interfaces and/or connection ports, universal serial bus (USB) interfaces and/or connection ports, joint test action group (JTAG) interfaces and/or connection ports, general purpose input/output (GPIO) signals and/or pins, RJ45 connection ports, serial peripheral interface (SPI) read-only memory (ROM) devices, video graphics array (VGA) interfaces and/or connections ports, server management processors, LAN-on-motherboard (LOM) adapter cards, PCIe cards, system power regulators, power sequencing logic, high-speed connections, portions of one or more of the same, variations or combinations of one or more of the same, and/or any other suitable peripherals and/or components.

In some examples, test board 502 includes and/or represents a circuit board (e.g., a printed circuit board) that contains a variety of materials. Some of these materials included in test board 502 can conduct electricity. Other materials included in test board 502 can insulate the conductive materials from one another.

In some examples, test board 502 can include and/or incorporate various electrically conductive layers, planes, and/or traces. In one example, each electrically conductive layer, plane, and/or trace can include and/or represent conductive material that is etched during fabrication. Additionally or alternatively, test board 502 can include and/or incorporate insulating material that facilitates mounting (e.g., mechanical support) and/or interconnection (e.g., electrical coupling) of electrical and/or electronic components.

Figure 6:
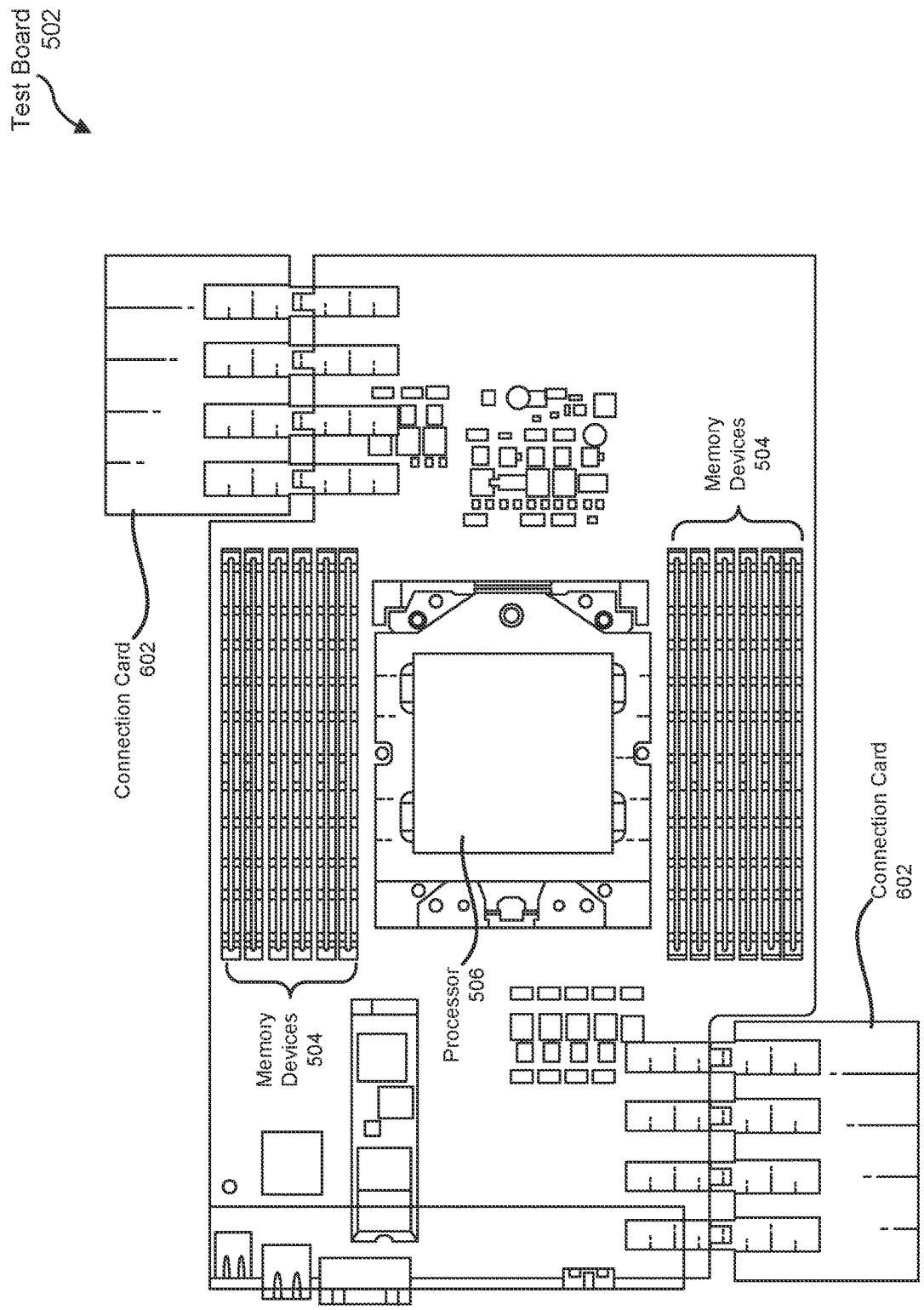
FIG. 6 is an illustration of an exemplary test board capable of conducting mission-mode testing on high-speed links according to one or more implementations of this disclosure.

FIG. 6 illustrates an exemplary implementation of test board 502 for conducting mission-mode testing on high-speed links and/or data fabric devices. As illustrated in FIG. 6, exemplary test board 502 can include and/or represent various interfaces, devices, components, and/or features. In some examples, test board 502 can include and/or represent certain components and/or features that perform and/or provide functionalities that are similar and/or identical to those described above in connection with any of FIGS. 1-5. For example, test board 502 can include and/or represent processor 506, which is the DUT for the SLT, as well as memory devices 504.

In some examples, test board 502 can also include and/or represent one or more connection cards 602 that serve and/or function as wire-to-wire connections. For example, connection cards 602 can provide and/or serve as electrical and/or communication couplings between communication links 402(1)-(4) and/or communication links 412(1)-(4) in FIG. 4. In this example connection cards 602 can communicatively couple interconnect controllers 114(1), 114(2), 124(1), and 124(2) to interconnect controllers 114(3), 114(4), 124(3), and 124(4), respectively.

In some examples, the various apparatuses, devices, and/or systems described in connection with FIGS. 1-6 can include and/or represent one or more additional circuits, components, devices, and/or features that are not necessarily illustrated and/or labeled in FIGS. 1-6. For example, data fabric device 100 can also include and/or represent additional analog and/or digital circuitry, onboard logic, transistors, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support mission-mode training and/or testing. In certain implementations, one or more of these additional circuits, components, devices, and/or features can be inserted and/or applied between any of the existing circuits, components, and/or devices illustrated in FIGS. 1-6 consistent with the aims and/or objectives provided herein. Accordingly, the communicative and/or electrical couplings described with reference to FIGS. 1-6 can be direct connections with no intermediate components, devices, and/or nodes or indirect connections with one or more intermediate components, devices, and/or nodes.

In some examples, the phrase "to couple" and/or the term "coupling", as used herein, can refer to a direct connection and/or an indirect connection. For example, a direct electrical coupling between two components can constitute and/or represent a coupling in which those two components are directly connected to each other by a single node that provides electrical continuity from one of those two components to the other. In other words, the direct coupling can exclude and/or omit any additional components between those two components.

Additionally or alternatively, an indirect electrical coupling between two components can constitute and/or represent a coupling in which those two components are indirectly connected to each other by multiple nodes that fail to provide electrical continuity from one of those two components to the other. In other words, the indirect coupling can include and/or incorporate at least one additional component between those two components.

Figure 7:
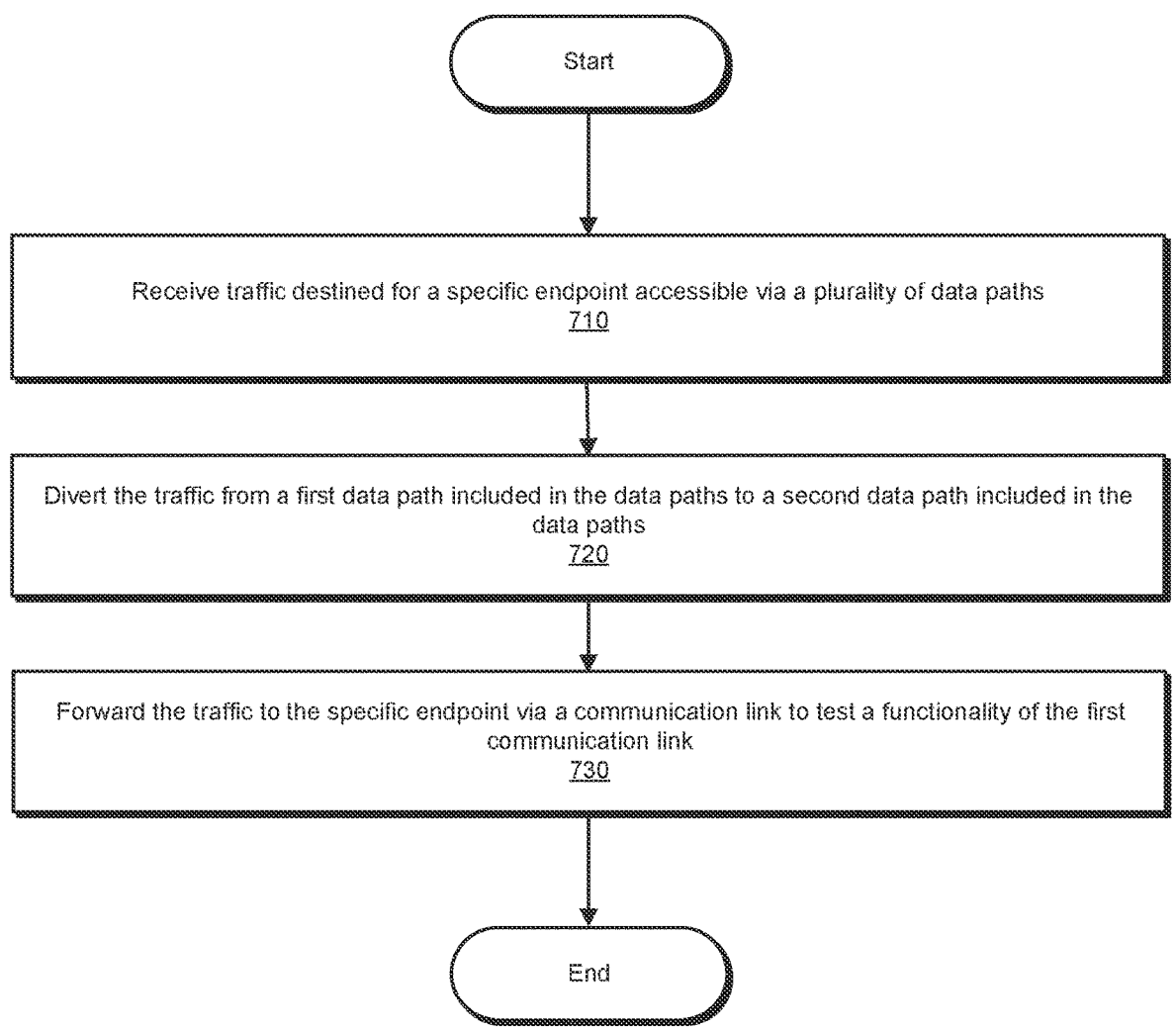
FIG. 7 is a flowchart of an exemplary method for conducting mission-mode testing on high-speed links according to one or more implementations of this disclosure.

FIG. 7 is a flow diagram of an exemplary method 700 for conducting mission-mode testing on data fabric devices. In one example, the steps shown in FIG. 7 can be performed and/or executed during mission-mode SLT conducted on a data fabric device. Additionally or alternatively, the steps shown in FIG. 7 can also incorporate and/or involve various sub-steps and/or variations consistent with the descriptions provided above in connection with FIGS. 1-6.

As illustrated in FIG. 7, exemplary method 700 include and/or involve the step of receiving traffic destined for a specific endpoint accessible via a plurality of data paths (710). Step 710 can be performed in a variety of ways, including any of those described above in connection with FIGS. 1-6. For example, a traffic moderator of a data fabric receives traffic destined for a specific endpoint accessible via a plurality of data paths.

Exemplary method 700 also includes the step of diverting the traffic from a first data path included in the data paths to a second data path included in the data paths (720). Step 720 can be performed in a variety of ways, including any of those described above in connection with FIGS. 1-6. For example, the traffic moderator of the data fabric diverts the traffic from a first data path included in the data paths to a second data path included in the data paths.

Exemplary method 700 further includes the step of forwarding the traffic to the specific endpoint via a communication link to test a functionality of the first communication link (730). Step 730 can be performed in a variety of ways, including any of those described above in connection with FIGS. 1-6. For example, an interconnect controller of the data fabric forwards the traffic to the specific endpoint via a communication link to test a functionality of the first communication link.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A data fabric device comprising:
   a first traffic moderator that:
      receives traffic destined for a specific endpoint accessible via a plurality of data paths; and
      reroutes the traffic from a first data path included in the data paths to a second data path included in the data paths; and
   a first interconnect controller that resides within the second data path and forwards the traffic to the specific endpoint via a first communication link to test a functionality of the first communication link.

2. The data fabric device of claim 1, wherein the first interconnect controller is configured to:
   spoof an address of the traffic to specify a remote socket; and
   send the traffic toward the specific endpoint via the first communication link based at least in part on the spoofed address of the traffic.

3. The data fabric device of claim 2, further comprising a second interconnect controller that resides within the second data path and is configured to:
   receive the traffic destined for the specific endpoint via a second communication link;
   replace the spoofed address of the traffic with an additional address that specifies a local socket; and
   send the traffic further toward the specific endpoint based at least in part on the additional address.

4. The data fabric device of claim 3, wherein the first communication link and the second communication link are communicatively coupled to one another.

5. The data fabric device of claim 1, further comprising a plurality of memory devices whose addresses are interleaved relative to one another; and
   wherein the specific endpoint comprises a specific memory device included in the memory devices.

6. The data fabric device of claim 1, further comprising a processing device configured to direct the first traffic moderator to enable a system-level test (SLT) mode; and
   wherein the first traffic moderator diverts the traffic from the first data path to the second data path due at least in part to the SLT mode being enabled.

7. The data fabric device of claim 6, wherein the first traffic moderator is further configured to:
   perform an address lookup for the traffic in the SLT mode;
   identify an address corresponding to the specific endpoint via the second data path; and
   apply the address to the traffic to direct the traffic along the second data path to the first interconnect controller.

8. The data fabric device of claim 6, wherein:
   the processing device is further configured to direct the first traffic moderator to disable the SLT mode upon completion of a system test; and
   the first traffic moderator is further configured to disable the SLT mode in response to the direction from the processing device by clearing a register responsible for setting the SLT mode.

9. The data fabric device of claim 8, wherein the processing device is further configured to achieve the disabling of the SLT mode without rebooting the data fabric device.

10. The data fabric device of claim 1, further comprising:
    a second traffic moderator configured to:
       receive additional traffic destined for an additional endpoint accessible via a plurality of additional data paths; and
       divert the traffic from a first data path included in the additional data paths to a second data path included in the additional data paths; and
    a second interconnect controller that resides within the second data path and is configured to forward the additional traffic to the additional endpoint via a second communication link to test a functionality of the second communication link.

11. The data fabric device of claim 10, further comprising:
    a first network socket implemented in connection with the first traffic moderator and the first interconnect controller; and
    a second network socket implemented in connection with the second traffic moderator and the second interconnect controller; and
    wherein the first communication link and second communication link collectively form a socket-to-socket connection for testing the first network socket and the second network socket by simulating communication at an operational speed.

12. The data fabric device of claim 11, further comprising:
    a first integrated circuit (IC) die that implements the first network socket; and
    a second IC die that implements the second network socket; and
    wherein the socket-to-socket connection spans across the first IC die and the second IC die.

13. The data fabric device of claim 1, wherein:
    the first traffic moderator comprises a cache-coherent moderator; and
    the first interconnect controller comprises a coherent socket extender.

14. The data fabric device of claim 1, further comprising at least one global memory interconnect that is communicatively coupled to the first traffic moderator and configured to:
    connect at least one processing device to the specific endpoint via the first traffic moderator, the first interconnect controller, and the first communication link;
    receive the traffic from the processing device; and
    feed the traffic to the first traffic moderator for transmission to the specific endpoint via the first communication link.

15. The data fabric device of claim 1, wherein the specific endpoint comprises a double data rate (DDR) memory device.

16. The data fabric device of claim 1, wherein the first communication link comprises a SerDes link.

17. The data fabric device of claim 1, wherein:
    the first data path excludes the first interconnect controller and the first communication link; and
    the second data path includes the first interconnect controller and the first communication link.

18. A system comprising:
    a test board;
    at least one endpoint device installed on the test board; and
    a data fabric device that is installed on the test board and comprises:
       a first traffic moderator that:
          receives traffic destined for the endpoint device; and
          reroutes the traffic from a first data path to a second data path; and
       a first interconnect controller that resides within the second data path and forwards the traffic to the endpoint via a first communication link to test a functionality of the first communication link.

19. The system of claim 18, wherein the first interconnect controller is configured to:
- spoof an address of the traffic to specify a remote socket; and
- send the traffic toward the endpoint via the first communication link based at least in part on the spoofed address of the traffic.

20. A method comprising:
- receiving, by a traffic moderator of a data fabric, traffic destined for a specific endpoint accessible via a plurality of data paths;
- rerouting, by the traffic moderator of the data fabric, the traffic from a first data path included in the data paths to a second data path included in the data paths; and
- forwarding, by an interconnect controller of the data fabric that resides within the second data path, the traffic to the specific endpoint via a communication link to test a functionality of the communication link.

* * * * *